(12) United States Patent
Dziadik

(10) Patent No.: US 8,173,888 B2
(45) Date of Patent: May 8, 2012

(54) SOLAR ENERGY COLLECTION SYSTEM AND COMPONENTS

(76) Inventor: Paul C. Dziadik, San Francisco, CA (US)

( * ) Notice: Subject to any disclaimer, the term of this patent is extended or adjusted under 35 U.S.C. 154(b) by 576 days.

(21) Appl. No.: 12/355,995

(22) Filed: Jan. 19, 2009

(65) Prior Publication Data

US 2010/0180887 A1 Jul. 22, 2010

(51) Int. Cl.
| | |
|---|---|
| H02N 6/00 | (2006.01) |
| H01L 31/042 | (2006.01) |
| H01L 31/00 | (2006.01) |
| E04D 13/18 | (2006.01) |
| E04H 14/00 | (2006.01) |
| F24J 2/48 | (2006.01) |

(52) U.S. Cl. ........ 136/244; 136/245; 136/261; 136/262; 52/173.3; 126/677

(58) Field of Classification Search .................. 136/261, 136/262, 244, 245; 126/677; 52/173.3
See application file for complete search history.

(56) References Cited

U.S. PATENT DOCUMENTS

| | | | | |
|---|---|---|---|---|
| 4,154,998 A | * | 5/1979 | Luft et al. | 219/633 |
| 4,227,922 A | * | 10/1980 | Laws et al. | 75/10.67 |
| 4,327,708 A | | 5/1982 | Taylor | |
| 4,491,681 A | * | 1/1985 | Kirpich | 136/246 |
| 5,176,758 A | | 1/1993 | Nath et al. | |
| 6,224,016 B1 | * | 5/2001 | Lee et al. | 244/30 |

* cited by examiner

*Primary Examiner* — Basia Ridley
*Assistant Examiner* — Allison Bourke
(74) *Attorney, Agent, or Firm* — Dale J. Ream

(57) ABSTRACT

A solar energy collection system and components includes a vacuum and an air compressor. The system includes a plurality of flexible units each having a backing portion and a solar cell portion upwardly adjacent and coupled to the backing portion. Each backing portion includes adhesive and at least one channel in the adhesive. Each channel is configured for communication with the vacuum to withdraw air from the channel when the adhesive is initially coupled to a structure and for communication with an air compressor to provide air to the channel to separate the adhesive from the structure. Each solar cell portion has an electricity generating element. The structure for coupling units transfers electricity between units. Each unit has an electricity outlet for passing electricity generated by at least one generating element for storage or use.

5 Claims, 6 Drawing Sheets

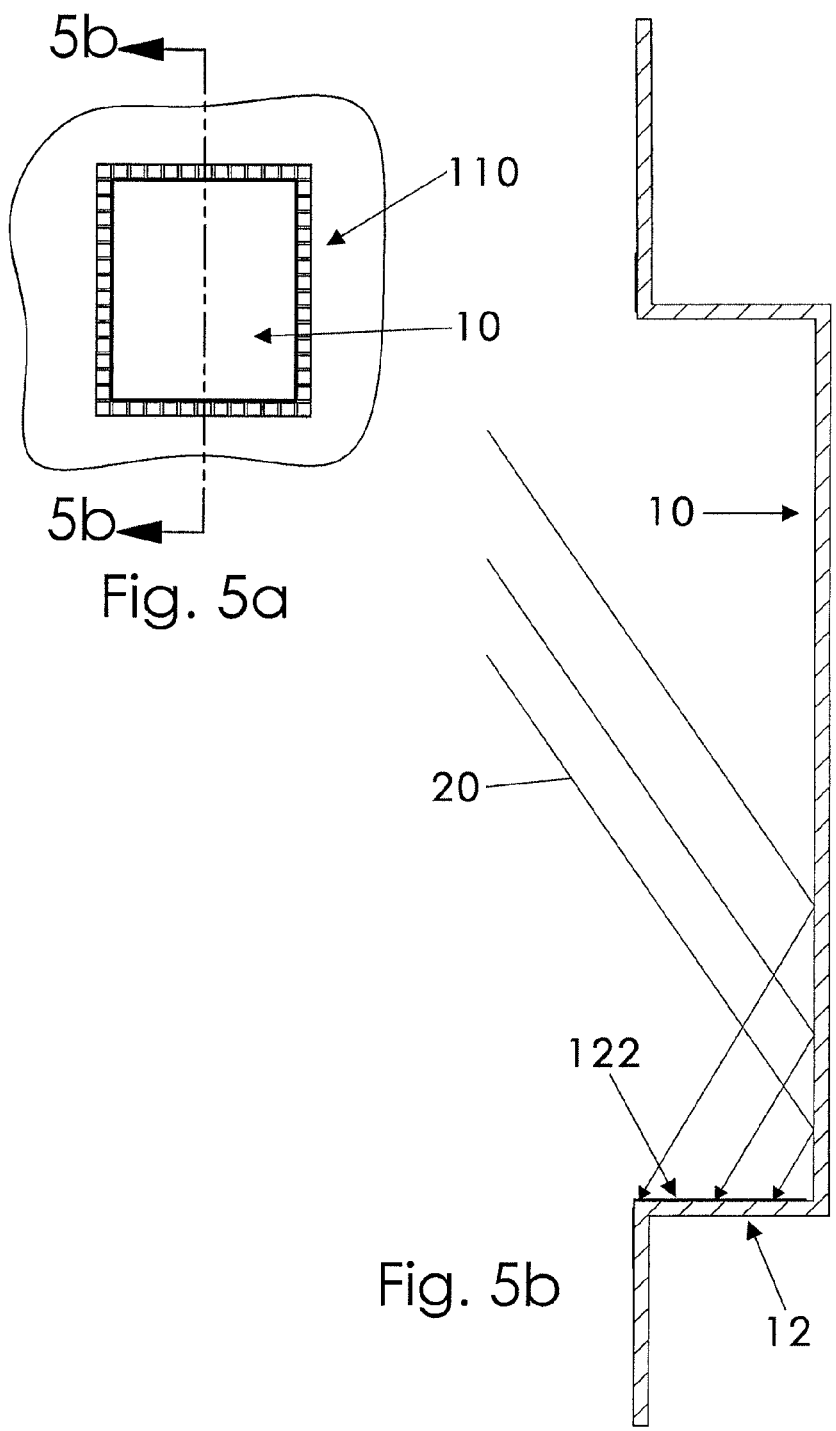

SOLAR ENERGY COLLECTION SYSTEM AND COMPONENTS

BACKGROUND OF THE INVENTION

This invention relates generally to solar energy devices and, more particularly, to a solar energy collection system and components that are attachable to the outside of a building or window structure for maximizing the collection of energy.

A very large amount of the energy we use for industry and consumer use comes directly or indirectly from the sun. In the past several years, technology and human engineering has enabled solar energy to be collected using solar cells, panels, and arrays and then converted into more useful forms of energy such as electricity. In some case, solar energy is relied upon to power large power grids such that electricity is only needed as a backup energy source.

Various devices have been constructed and proposed in the patents for collecting the sun's energy falling on the roofs of buildings and homes or the ground. Although assumably effective for their intended purposes, a significant amount of the sun's rays falling on the sides of buildings and even on or around windows is being overlooked and not harvested for conversion into useful energy.

Therefore, it would be desirable to have a solar energy collection system that collects solar energy striking the sides of buildings. Further, it would be desirable to have a solar energy collection system with the solar cells having adhesive backing that is easy to install in and around windows and window wells and that does not significantly alter the aesthetic appearance of the building's exterior. In addition, it would be desirable to have a solar energy collection system that that is modular such that individual portions of the system may be easily installed and removed.

SUMMARY OF THE INVENTION

Accordingly, a solar energy collection system and components includes a vacuum and an air compressor. The system includes a plurality of flexible units each having a backing portion and a solar cell portion upwardly adjacent and coupled to the backing portion. Each backing portion includes adhesive and at least one channel in the adhesive. Each channel is configured for communication with the vacuum to withdraw air from the channel when the adhesive is initially coupled to a structure and for communication with an air compressor to provide air to the channel to separate the adhesive from the structure. Each solar cell portion has an electricity generating element. The structure for coupling units transfers electricity between units. Each unit has an electricity outlet for passing electricity generated by at least one generating element for storage or use.

Therefore, a general object of this invention is to provide a solar energy collection system that collects solar energy striking the sides of a building and around its windows.

Another object of this invention is to provide a solar energy collection system, as aforesaid, that includes solar cells having adhesive backing for easy installation on and removal from the sides of buildings, on windows, and in window wells.

Still another object of this invention is to provide a solar energy collection system, as aforesaid, that includes a vacuum that enables the air to be removed from a channel so as to adhere to a surface and includes an air compressor for injecting air into the channel for removal from the surface.

Yet another object of this invention is to provide a solar energy collection system, as aforesaid, that is modular so that portions of the system may be selectively added or removed.

A further object of this invention is to provide a solar energy collection system, as aforesaid, that is cost effective to install.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is an isolated view on an enlarged scale taken from FIG. 3a;

FIG. 5a is another perspective view of the solar energy collection system attached to a wall;

FIG. 5b is a sectional view taken along line 5b-5b of FIG. 5a; and

DESCRIPTION OF THE PREFERRED EMBODIMENT

Figure 6:
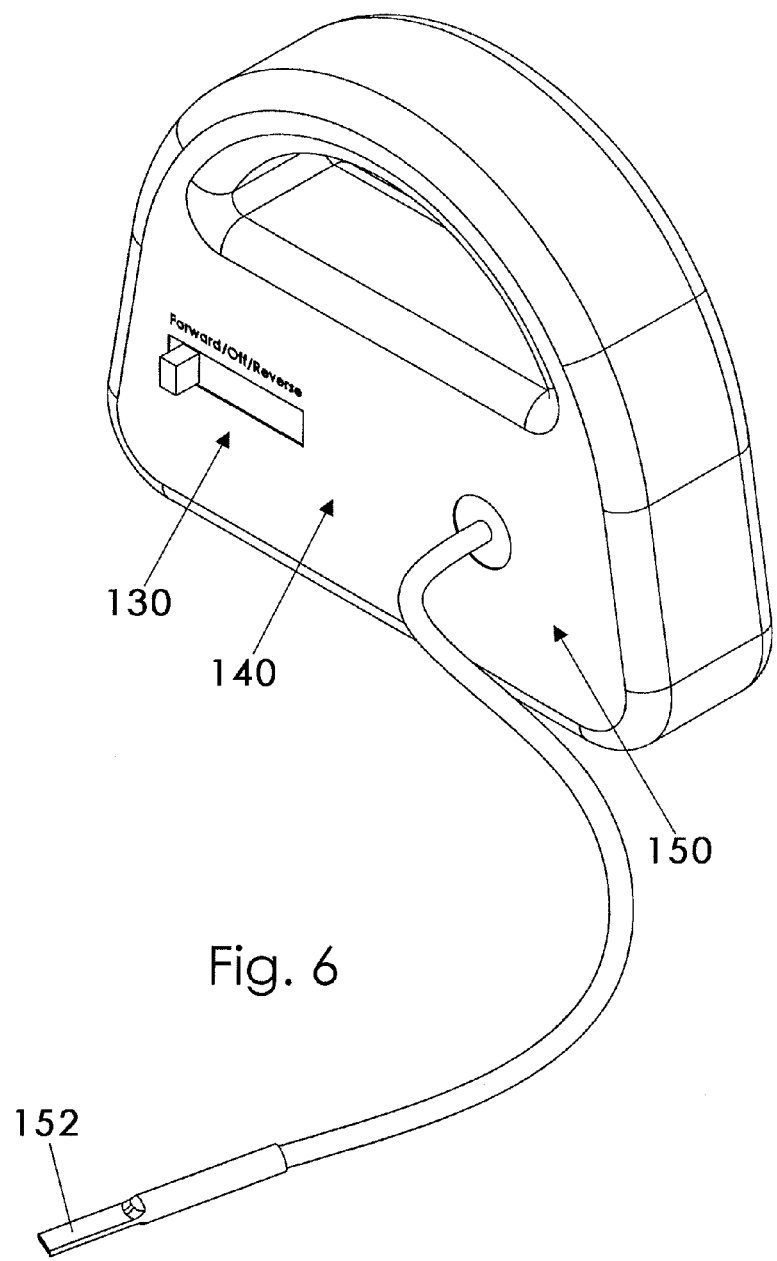
FIG. 6 is a perspective view of an air compressor according to a preferred embodiment of the present invention.

A solar energy collection system and its components will now be described in detail with reference to FIG. 1 through FIG. 6 of the accompanying drawings. More particularly, a solar energy collection system 100 includes a plurality of solar energy collection apparatuses (or "units") 100, a vacuum 130, and an air compressor (e.g., fan) 140. The vacuum 130 and the compressor 140 may utilize a common housing 150 and even common components (e.g., a fan blade, an input/output element 152, etc.), as shown in FIG. 6.

Figure 4A:
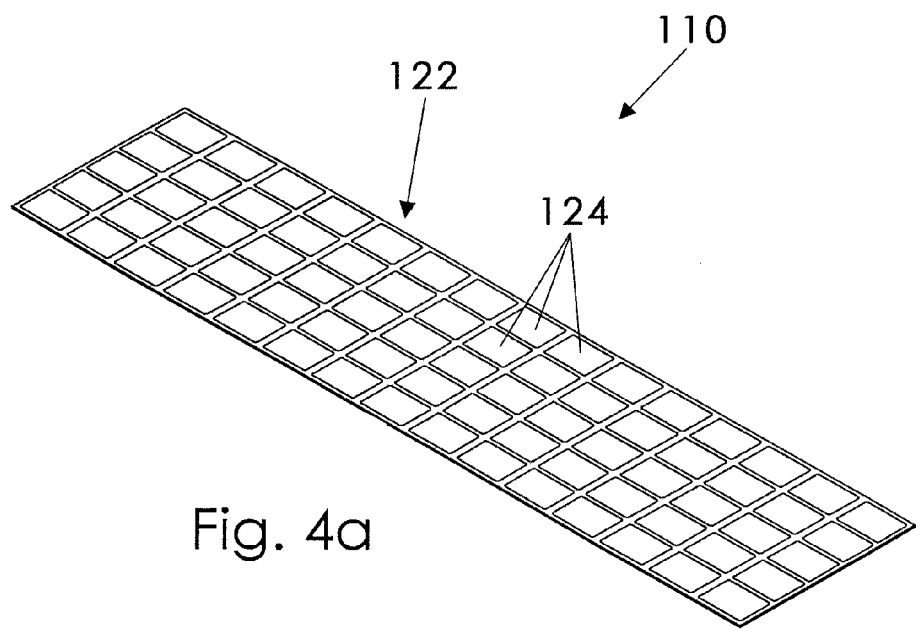
FIG. 4a is a perspective view of another portion of the solar array taken from the solar energy collection system as in FIG. 1.
Figure 4B:
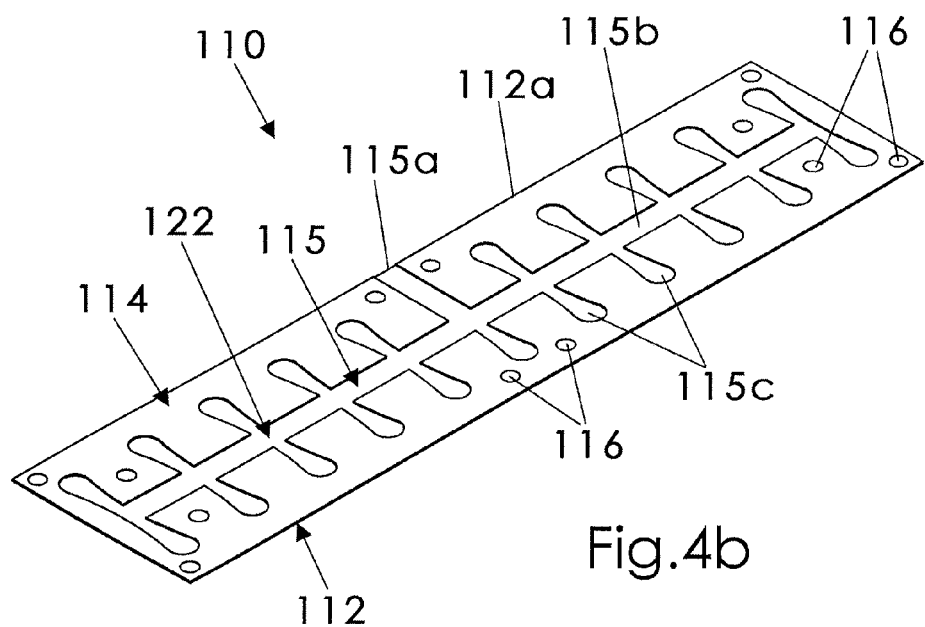
FIG. 4b is a bottom view of a portion of a single solar energy collection unit according to the present invention.

As shown in FIGS. 4a and 4b, each unit 110 has a backing portion 112 and a solar cell portion 122 upwardly coupled to the backing portion 112. The backing portion 112 (FIG. 4b) has adhesive 114 (i.e., an adhesive layer) and at least one channel 115 in the adhesive 114. The channel 115 is configured for communication with the vacuum 130 and the air compressor 140 (e.g., with the input/output element 152), such as at a port 115a in the channel 115 that extends to an edge 112a of the backing portion 112. As shown in FIG. 4b, the channel 115 may include an elongate primary portion 115b and a plurality of branches 115c extending from the primary portion 115b, and the backing portion 112 may have an outlet passage 116 in the adhesive 114.

The solar cell portion 122 has an electricity generating element 124 (FIGS. 3b and 4a) in communication with an electricity outlet 126 for passing electricity generated by the generating element 124 for storage and/or use. The electricity generating element 124 may include, for example, copper indium gallium selenide, amorphous silicon, and/or any other appropriate material useful in generating electricity from solar energy. While it may be preferable for the backing portion 112 and the solar cell portion 122 to be flexible, non-flexible materials may instead be used in some embodiments.

Figure 3A:
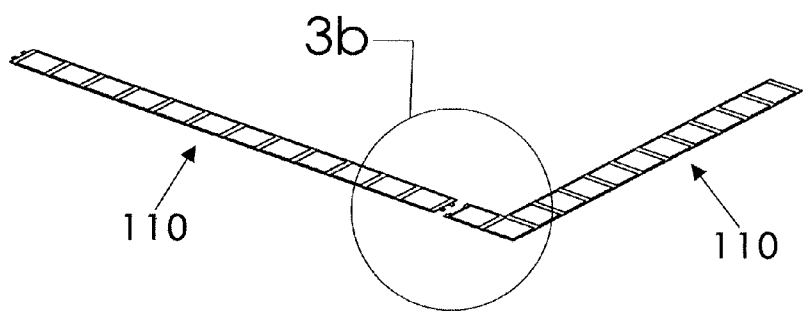
FIG. 3a is a perspective view of a portion of the solar energy collection system removed from the window sill.
Figure 3B:
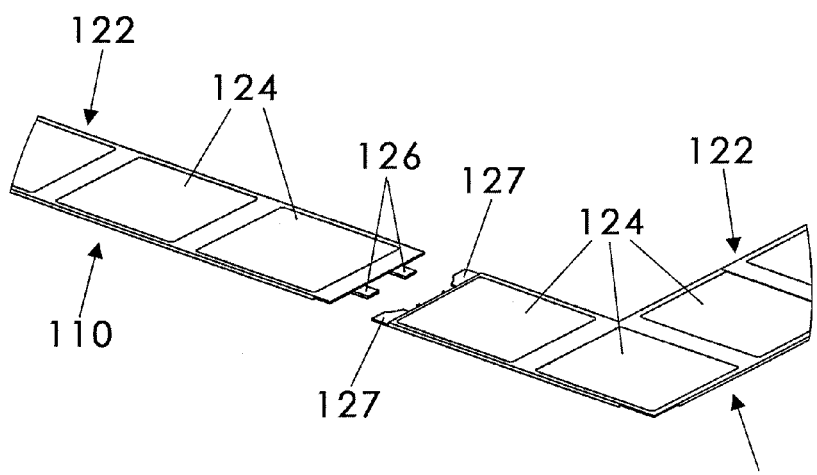

Various electricity outlets 126 may be included. For example, as shown in FIG. 3b, some outlets 126 may be complementary to electricity inputs 127 of other units 110 to transfer electricity between the units 110; other outlets 126 may pass the generated electricity out of the system 100 for use and/or storage (not shown). The outlets 126 for passing electricity out of the system 100 may, for example, pass through the outlet passages 116.

Figure 1:
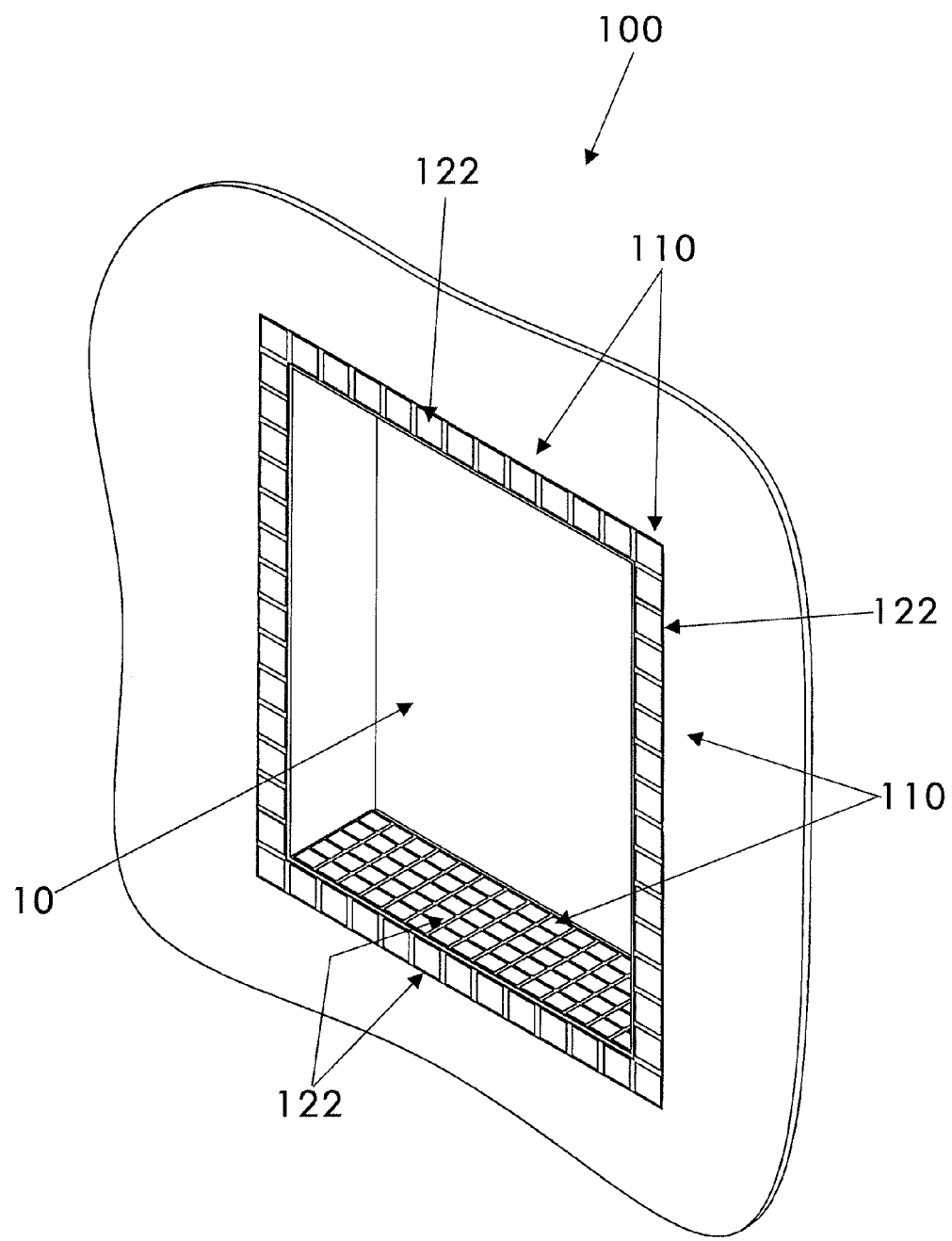
FIG. 1 is a perspective view of the solar energy collection system according to the present invention installed on a wall and window sill.
Figure 2:
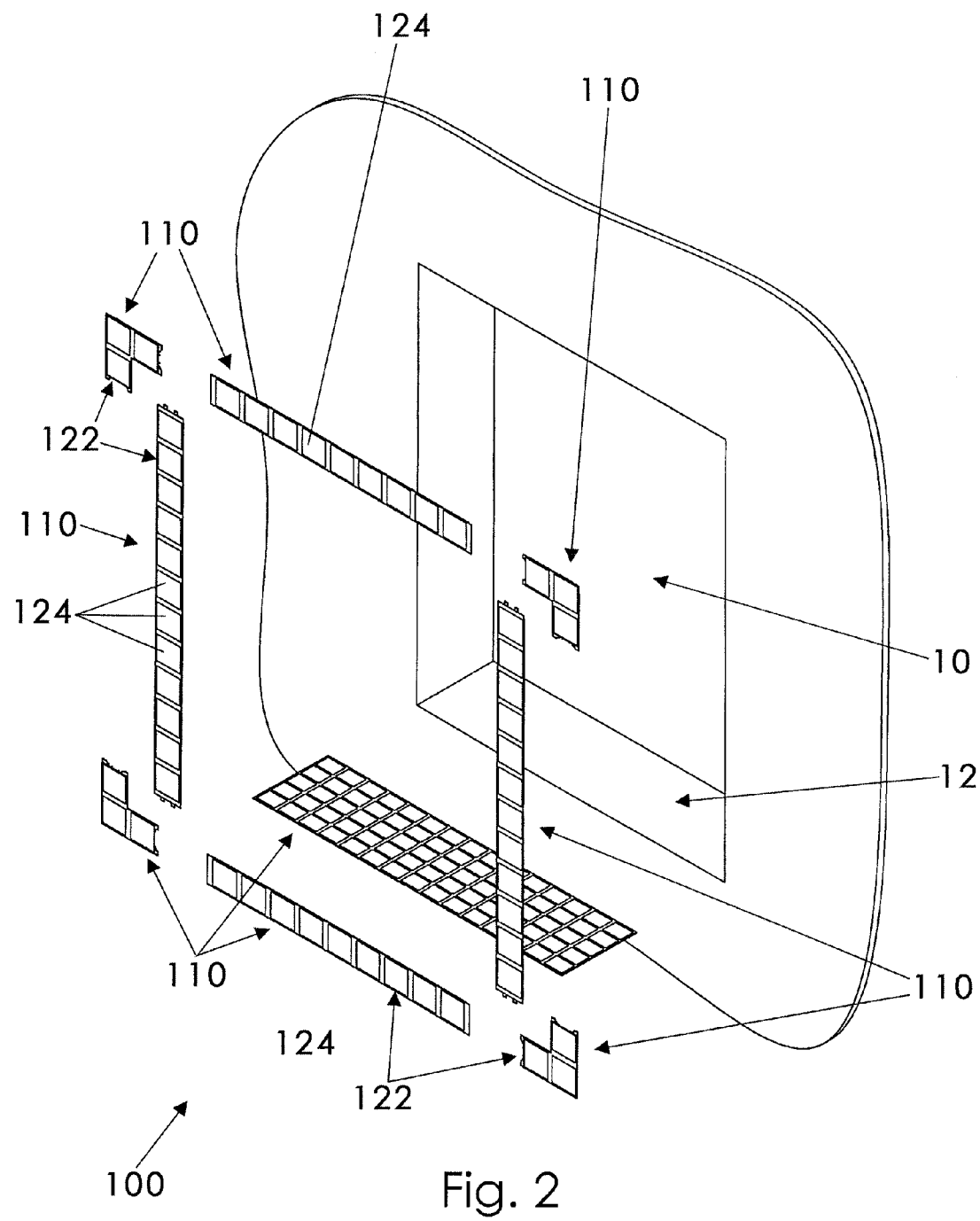
FIG. 2 is an exploded view of the solar energy collection system as in FIG. 1.

Means (e.g., clips, fasteners, mating structures, adhesive, etc.) may be included for coupling the units 110 to one another. In some embodiments, as shown in FIG. 3b, the outlets 126 and inputs 127 may be used to couple the units 110 together, either alone or with additional coupling devices. As shown in FIGS. 1 and 2, the solar cell portions 122 may be configured to collectively surround a window 10 and substantially cover a window sill 12 when coupled together, though other configurations may also be appropriate.

In use, each unit 110 may be adhered to a structure (e.g., wall or window sill 12) by its adhesive 114. While the adhesive 114 is setting, the input/output element 152 may be inserted in the unit's port 115a. The vacuum 130 may then be actuated to evacuate the air from the unit's channel 115 to provide a clamping force. The clamping force may aid in holding the unit 110 in place before the adhesive 114 sets. The units 110 may be coupled together (as discussed above) before any of the units 110 are adhered to the structure, or alternately units 110 may be coupled to other units 110 that are already adhered to the structure.

The generating elements 124 may generate electricity, as is known in the art, and the generated electricity may be transferred by the outlets 126, as set forth above, for storage and/or use. FIG. 5b shows that, in addition to direct sunlight received by the generating elements 124 atop the window sill 12, those generating elements 124 may additionally receive sunlight 20 reflected by the window 10 to produce electricity.

To remove a unit 100 from the structure (e.g., the wall and/or window sill 12), the input/output element 152 may be inserted in the unit's port 115a. The air compressor 140 may then be actuated to force air into the channel 115 to aid in separating the adhesive 114 from the structure.

It is understood that while certain forms of this invention have been illustrated and described, it is not limited thereto except insofar as such limitations are included in the following claims and allowable functional equivalents thereof.

The invention claimed is:

1. A solar energy collection system for use with a building structure, comprising:
   a housing;
   a vacuum situated in said housing;
   an air compressor situated in said housing;
   an input/output element operatively coupled to said vacuum and to said air compressor, said input/output element extending away from said housing;
   a plurality of flexible units, including a first and second flexible unit and each flexible unit comprising:
      a backing portion having an adhesive configured to attach said backing portion to the building structure and defining at least one channel in said adhesive;
      wherein said at least one channel includes a primary portion and a plurality of branches extending perpendicularly from said primary portion;
      a port in communication with said channel, said port being in selective communication with said input/output element such that air from said channel is withdrawn when said vacuum is actuated and such that air is inserted into said channel when said air compressor is actuated;
      a solar cell portion upwardly adjacent and coupled to said backing portion, said solar cell portion including:
         an electricity generating element;
         an electricity outlet electrically connected to said electricity generating element and configured to transfer electricity generated by said electricity generating element;
         an electricity input electrically connected to said electricity generating element and configured to receive electricity from a respective electricity outlet of the second flexible unit; and
      wherein said electricity outlet of the flexible unit is selectively coupled to said electricity input of the second flexible unit so that said first flexible unit is electrically connected to said second flexible unit.

2. The system of claim 1, wherein
at least one said electricity outlet passes electricity out of said system.

3. The system of claim 2, wherein said flexible units are collectively configured to surround a window and substantially cover a window sill.

4. The system of claim 3, wherein said electricity generating elements include at least one of copper indium gallium selenide.

5. The system of claim 1, wherein said flexible units are collectively configured to surround a window and substantially cover a window sill.

* * * * *